(12) United States Patent
Ortmann et al.

(10) Patent No.: US 11,445,860 B2
(45) Date of Patent: Sep. 20, 2022

(54) HOUSEHOLD FOOD PROCESSOR

(71) Applicant: Vorwerk & Co. Interholding GmbH, Wuppertal (DE)

(72) Inventors: Roman Ortmann, Duisburg (DE); Gerhard Isenberg, Cologne (DE); Sarah Thutewohl, Dortmund (DE); Samuel Möller, Telgte (DE)

(73) Assignee: Vorwerk & Co. Interholding GmbH

( * ) Notice: Subject to any disclaimer, the term of this patent is extended or adjusted under 35 U.S.C. 154(b) by 256 days.

(21) Appl. No.: 16/293,095

(22) Filed: Mar. 5, 2019

(65) Prior Publication Data

US 2019/0282982 A1   Sep. 19, 2019

(30) Foreign Application Priority Data

Mar. 13, 2018  (DE) .......................... 102018203719.1

(51) Int. Cl.
| | |
|---|---|
| *A47J 43/07* | (2006.01) |
| *G01F 1/58* | (2006.01) |
| *B01F 33/83* | (2022.01) |
| *B02C 25/00* | (2006.01) |
| *B01F 33/80* | (2022.01) |

(52) U.S. Cl.
CPC ........... *A47J 43/07* (2013.01); *A47J 43/0716* (2013.01); *B01F 33/83* (2022.01); *B02C 25/00* (2013.01); *G01F 1/58* (2013.01); *A47J 2043/0733* (2013.01); *B01F 33/83611* (2022.01)

(58) Field of Classification Search
CPC ........... B01F 15/00168; B01F 13/1041; B01F 15/00194; B01F 2215/0026; B01F 2013/108; A47J 43/0716; A47J 2043/0733; A47J 43/046; A47J 43/07; G01F 1/58; G01F 25/0046; G01F 1/56
See application file for complete search history.

(56) References Cited

U.S. PATENT DOCUMENTS

| | | | | | |
|---|---|---|---|---|---|
| 3,839,912 | A | * | 10/1974 | Schmoock | .............. G01F 1/584 73/861.12 |
| 4,122,714 | A | * | 10/1978 | Kobayashi | .............. G01F 1/002 73/291 |
| 7,322,536 | B2 | * | 1/2008 | Garvin | .................. B02C 13/286 241/34 |
| 9,084,998 | B2 | * | 7/2015 | Belotserkovskiy | ..... B02C 2/007 |
| 9,556,599 | B2 | * | 1/2017 | Starkey | .................. E03C 1/2665 |

(Continued)

FOREIGN PATENT DOCUMENTS

| | | |
|---|---|---|
| DE | 4414825 A1 | 11/1995 |
| DE | 102008027353 A1 | 12/2009 |

(Continued)

*Primary Examiner* — Faye Francis
(74) *Attorney, Agent, or Firm* — Barnes & Thornburg LLP

(57) ABSTRACT

A household appliance includes the food preparation container, into which an ingredient for food preparation can be fed by the user. The household appliance includes at least one sensor for determining a feeding quantity of an ingredient as the ingredient is being fed into the food preparation container. A control device of the household appliance is configured to determine the feeding quantity based on a sensor signal of the at least one sensor such that a user can prepare particularly reliably and reproducibly a food that requires a uniform feed of an ingredient for a predetermined period of time.

22 Claims, 2 Drawing Sheets

(56) References Cited

U.S. PATENT DOCUMENTS

Figure 1:
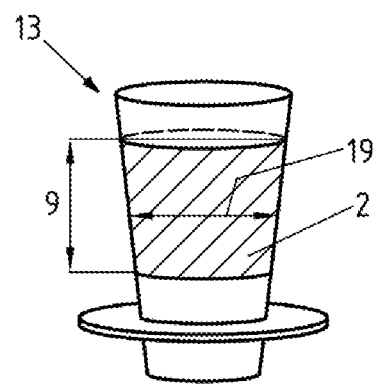

| | | | |
|---|---|---|---|
| 9,878,331 B2* | 1/2018 | Starkey | B02C 25/00 |
| 10,286,404 B2* | 5/2019 | Starkey | B02C 18/0084 |
| 2010/0005903 A1* | 1/2010 | Beavis | G01F 3/10 |
| | | | 73/861.47 |
| 2010/0181397 A1* | 7/2010 | Wallin | B02C 23/02 |
| | | | 241/34 |
| 2016/0270598 A1* | 9/2016 | Vu | A47J 31/60 |
| 2017/0105670 A1* | 4/2017 | Holt | G01F 23/268 |
| 2019/0239695 A1* | 8/2019 | Holzbauer | A47J 43/0794 |

FOREIGN PATENT DOCUMENTS

| | | |
|---|---|---|
| DE | 102013106691 A1 | 1/2014 |
| DE | 102016219972 A1 | 4/2018 |

\* cited by examiner

HOUSEHOLD FOOD PROCESSOR

PRIORITY CLAIM

This application claims priority to German Application No. 102018203719.1, filed Mar. 13, 2018, which application is hereby incorporated in its entirety herein.

FIELD OF THE DISCLOSURE

The present disclosure relates to a household appliance, in particular a household food processor, for preparing food particularly by chopping, blending and/or heating the food in a food preparation container. The household appliance comprises the food preparation container, into which an ingredient for food preparation can be fed by the user.

BACKGROUND

When preparing certain foods, such as dough or mayonnaise, with a household food processor, a predefined quantity of an ingredient, such as flour or oil, has to be manually fed into the food preparation container by the user over a defined period of time and in a uniform manner. If the user feeds the ingredient too quickly, lumps may be produced in a dough, for example, or the desired emulsification of the oil may not take place as intended when preparing mayonnaise. If, however, the ingredient is fed too slowly, an insufficient quantity of the ingredient was added at the end of the defined period of time, so that the recipe was not complied with, and thus, the desired quality of the cooking result is generally not obtained.

SUMMARY

The object of the present disclosure is to provide a household appliance that has been developed further.

A household appliance according to the present disclosure serves for achieving the object. Advantageous embodiments are apparent from the description and drawings provided in this paper.

A household appliance serves for achieving the object, in particular a household food processor, for preparing food particularly by chopping, blending and/or heating the food in a food preparation container. The household appliance comprises the food preparation container, into which an ingredient for food preparation can be fed by the user. At least one sensor is provided for determining a feeding quantity of an ingredient as the ingredient is being fed into the food preparation container. A control device of the household appliance is configured such that the feeding quantity is determined based on a sensor signal of the sensor.

In this way, a food that requires a uniform feed of an ingredient for a predetermined period of time can be prepared particularly reliably and reproducibly by a user.

A household appliance and a household food processor are devices that are configured and intended for use in private households. Thus, they are not industrially used devices for preparing food.

The feeding quantity that is being determined is the current feeding quantity, which is generally detected by the sensor in a continuous and/or time-resolved manner. The feeding quantity may be determined by the control device in quantity per unit time or mass per unit time, for example.

In one embodiment, the sensor is arranged such that the ingredient moves past the sensor as it is fed into the food preparation container. A particularly reliable and precise detection of the feeding quantity can be made possible in this manner. Alternatively or additionally, the sensor is arranged at the, during operation, upper side of the food preparation container. An ingredient can be fed into the food preparation container by exploiting gravity, and the feeding quantity can be detected in the process. A particularly simple structure of the household appliance and a simple usage are thus made possible. In one configuration, the sensor can be attached to or integrated into a lid, an attachment on the food preparation container, or on a housing of the household appliance.

In one embodiment, the sensor is an electrostatic-induction-based sensor. A particularly reliable and precise detection of the feeding quantity or the feeding flow can be made possible in this manner even for small quantities in the μg range. In addition, an electrostatic-induction-based sensor can be produced and implemented with particularly little effort. In an alternative configuration, the sensor is based on at least one light barrier or an optical measuring assembly, in particular for measuring the radial extent of the ingredient flow.

An electrostatic-induction-based sensor is set up so that a passage of a charged particle basically results in a current flow, so that the electrostatic-induction-based sensor can output a sensor signal which correlates, for example, with the quantity of passing charged particles. In this case, a charged particle is a particle of an ingredient, such as a powder grain of flour.

In one embodiment, the electrostatic-induction-based sensor comprises an electrode and/or an electrostatic shielding means for the electrode. The electrode consists of an electrically conductive material, in particular metal. The shielding means, which may be configured as a separate component or a coating, consists of an electrically insulating material, such as plastic. Thus, the material shielding means is not electrically conductive. In particular, the shielding means is disposed adjacent to the electrode, preferably in such a manner that an ingredient, when fed into the food preparation container, moves past the electrode on one side of the electrode—hereinafter also referred to as inner face—and the shielding means adjoins the opposite side of the electrode. In particular, the shielding means is disposed exactly between the electrode and the component to which the electrode, together with the shielding means, is attached or into which it is integrated. In a preferred configuration, the electrode has an insulating layer on the side which the ingredient passes when it is conveyed, in order to reduce interfering influences.

Particles regularly have a charge. If such a particle, which may also be referred to as a point charge, passes by the electrostatic-induction-based sensor, the point charge forms an electrostatic field. As soon as the point charge approaches the sensor, the electrostatic field acts on the above-mentioned side or inner face of the electrode, past which the particles can move when an ingredient is conveyed. As a consequence, the oppositely charged free charge carriers in the material of the electrode of the sensor move towards this side of the electrode, i.e. the inner face, and the same number of charges is conducted out of the sensor, which generates a current flow. Thus, a charge is induced, which results in a current flow, which in turn may be outputted as a sensor signal or be converted into a sensor signal, e.g. with the unit voltage, and/or amplified.

In one embodiment, the sensor has a closed contour or ring shape, so that the ingredient moves past an inner face of the closed or ring-shaped sensor as it is fed into the food preparation container. It is thus possible to prevent parts of the ingredient from eluding the detection by the sensor during the feeding process. In particular, the sensor has the shape of a cylinder or of a truncated cone.

If the sensor is the electrostatic-induction-based sensor, a correlation of the radial distance of a point charge from a center axis through the ring-shaped or closed sensor with the level of the charge induced by the point charge in the sensor can be obtained. The induced charge increases the closer the point charge comes to the center of the sensor or the center axis. This correlation can be described with a bell-shaped curve, in particular having a course as in a Gaussian curve, in which the induced charge is plotted on the Y-axis and the distance of the point charge from the center axis is plotted on the X-axis. The current signal, which is outputted as the sensor signal in one configuration, in that case describes the drain or change of the induced charge over the distance to the center axis. Peaks in the sensor signal or current signal are generated at inflection points of the curve of the induced charge.

If several particles pass the sensor simultaneously, the superposition principle applies, i.e. the field lines of the particles superimpose and the charges are added up, resulting in a sum current flow. Since the current signal, as a rule, is relatively small, a current amplifier for amplifying the current signal can preferably by used. A converter for converting the current signal into a voltage signal can preferably be used for a better processability of the sensor signal.

In one embodiment, the sensor has a sensor length in the feed direction of the ingredient into the food preparation container that corresponds to one time to two times, preferably about 1.3 times, a sensor diameter. If, in one configuration, the sensor or the electrode are not shaped to be cylindrical but, for example, frustoconical, the sensor length corresponds to the average sensor diameter over the sensor length. Tests have shown that an electrostatic-induction-based sensor works particularly reliably and precisely for detecting a feeding quantity if the sensor length is no larger than twice the size of the sensor diameter and/or no smaller than the sensor diameter. The best results were obtained with a sensor whose sensor length corresponds to about 1.3 times the sensor diameter.

In one embodiment, the sensor is attached to or integrated into a lid for the food preparation container or a, in particular funnel-shaped, attachment for the lid or the food preparation container. It is thus particularly easy to make it possible for the particles to merely pass the sensor. Preferably, the lid has a central and, in particular, circular opening for feeding ingredients. In particular, the attachment can be placed or fitted onto the lid by the user in a manually detachable manner such that the attachment and the opening of the lid form a common feeding passage for ingredients. In the case of an electrostatic-induction-based sensor, it may, given a ring-shaped configuration, form a part of the attachment in one configuration, in order to enable a compact design. If the sensor is attached to the lid, the sensor may be attached above or below the lid, preferably centered relative to the opening, or to the inner face of the opening of the lid.

In one configuration, the sensor has a wireless communication interface, preferably in connection with a battery, for wirelessly transmitting a signal or the sensor signal to the control device. In particular, an electronic evaluation system is preferably accommodated in the immediate vicinity of the sensor, or an evaluation is implemented by a program code in the control device. In one configuration, the sensor is built into the pot or lid, and the integrated electronic evaluation system is supplied with electrical energy via a contact member and/or either wirelessly broadcasts its evaluation data to the control device in the housing of the household appliance or transmits the evaluation data in a wired manner via a contact module. In one configuration, only the sensor lines are present in the pot or lid and are preferably routed to the control device in an electrically shielded manner. Then, the evaluation takes place in the control device.

In one embodiment, the control device is configured such that the feeding quantity is determined based on the sensor signal, using a calibration curve. A particularly reliable and precise determination of the feeding quantity can be realized in this manner. In particular, a calibration curve specifies the correlation of the sensor signal with the feeding quantity, in particular for a certain ingredient.

In one configuration, several calibration curves are respectively stored in the control device for a certain ingredient, preferably from series of tests previously carried out at the manufacturer. Thus, the calibration curves are ready at any time for determining the feeding quantity. By using a digital recipe through a user interface or by a user inputting the ingredient that is to be added, the control unit receives information about the ingredient that is added. Assigning the respective calibration curve is thus possible without any problems.

In one configuration, a calibration curve is generated by the household appliance. In this way, a calibration curve can be newly generated for a certain ingredient, which, for example, was not previously stored in the control device. Based on the different electrostatic charges of different ingredients, characteristic calibration curves can be respectively generated for each ingredient, which may differ particularly with respect to the gradient of the, in particular substantially linear, calibration curve, wherein the feeding quantity is plotted on the X-axis and the absolute value of the sensor signal on the Y-axis. In particular, the ingredient may consist of a mixture of several substances. A separate calibration curve may also be generated for this; e.g. for a baking mixture including at least the constituents flour and sugar. In particular, generating a calibration curve includes recording the sensor signals for different quantities of the respective ingredient while the ingredient moves past the sensor. These amounts may be weighed beforehand by the user. In this way, the calibration curve is produced, which may be an interpolated and/or extrapolated curve over at least three, preferably at least five, measurement points. In particular, each measurement point is formed by the integrated sensor signal on the Y-axis and the corresponding quantity of the ingredient on the X-axis. Measured data regarding environmental influences, such as fluctuations in temperature, air humidity and air pressure, may be taken into account via a cloud, for example.

In one embodiment, a weight sensor is provided. In particular, the weight sensor can be used for generating the calibration curve or for monitoring the determined feeding quantity. A particularly reliable determination of the feeding quantity can be made possible in this manner. For generating a new calibration curve for an ingredient, the sensor signal is in one configuration recorded during the feeding process of the ingredient and the signal of the weight sensor is recorded simultaneously, in order to obtain the calibration curve for this ingredient by plotting the, in particular integrated, sensor signal from the sensor against the measured weight from the weight sensor. Thus, the user need not previously weigh the ingredient in order to generate the calibration curve. In particular in defined intervals during the feeding process of an ingredient, the difference of the weight at the intervals is determined by the control unit in one configuration, and compared to the integrated feeding quantity, which was determined by means of the sensor. Preferably, a tolerance band is used in order to output, in the case of a correspondingly large difference of the two quantity values calculated in the comparison, the result that the measurement by the sensor could be inaccurate or faulty. Corresponding measures can then be initiated in order to reduce a negative influence on the cooking result. In particular, the sensor may be the weight sensor. A weight sensor is frequently already integrated into the household appliance for food preparation.

In particular, a weight sensor is disposed in the preferably three feet of the household appliance. In this way, the weight sensor can have a dual function. A feeding quantity determined by the weight sensor is generally subject to interference from the inertia force, the force of the impact of the ingredient on the bottom of the food preparation container and possible imbalance forces from food preparation, e.g. while stirring and kneading. These interfering influences are also detected by a weight sensor, so that the determined weight or feeding quantity are erroneously increased or reduced by the interferences. These interfering parameters may be reduced if the ingredient is supplied more uniformly. Another drawback of the weight sensor lies in the fact that the weight sensor in the household appliance for food preparation regularly makes relatively inaccurate measurements. However, a weight sensor with high accuracy and time resolution would require much technical effort, particularly as compared to an electrostatic-induction-based sensor.

In one embodiment, the household appliance is configured such that an indication is outputted to the user, which indicates to the user whether the ingredient, at the moment, is being fed into the food preparation container too quickly or too slowly. Thus, the user is able to adjust the feeding quantity of feeding speed. The reproducibility and quality of the cooking result can thus be enhanced. In particular, the indication is an acoustic and/or visual indication. In particular, the household appliance has a display for outputting the visual indication. In one configuration, the indication includes a target curve for the scheduled feeding quantity over a defined period of time and/or a corresponding actual curve. In particular, the actual curve is compared to the target curve and/or outputted to the user together with the target curve. Through a digital recipe or by means of a user input via a user interface, the control device can obtain the information over which period of time which total quantity of an ingredient is to be uniformly fed into the food preparation container. The control device determines the target curve particularly in connection with the information about the respective ingredient, by means of which the corresponding calibration curve can be selected.

In order to determine whether the user, at the moment, feeds the ingredient into the food preparation container too quickly or too slowly, the actual curve can be compared to the target curve by the control device. If the actual curve lies below the target curve, the ingredient is being fed too slowly. If the actual curve lies above the target curve, the ingredient is being fed too quickly. Accordingly, the above-mentioned indication can be generated on this basis, particularly if previously set minimum distances from the target curve and the actual curve are exceeded. In one configuration, the target curve and the actual curve depict the time-incremental feeding quantity, i.e. the time-resolved feeding quantity. Alternatively or additionally, the target curve and the actual curve depict the feeding quantity of the ingredient, integrated beginning from the start of feeding. In particular, the user is given the information, by means of the indication, how much of the ingredient is being fed, and whether the feeding quantity, e.g. per second, is too high or too low.

Exemplary embodiments of the present disclosure will be explained below in more detail, also with reference to Figures.

BRIEF DESCRIPTIONS OF THE DRAWINGS

Figure 2:
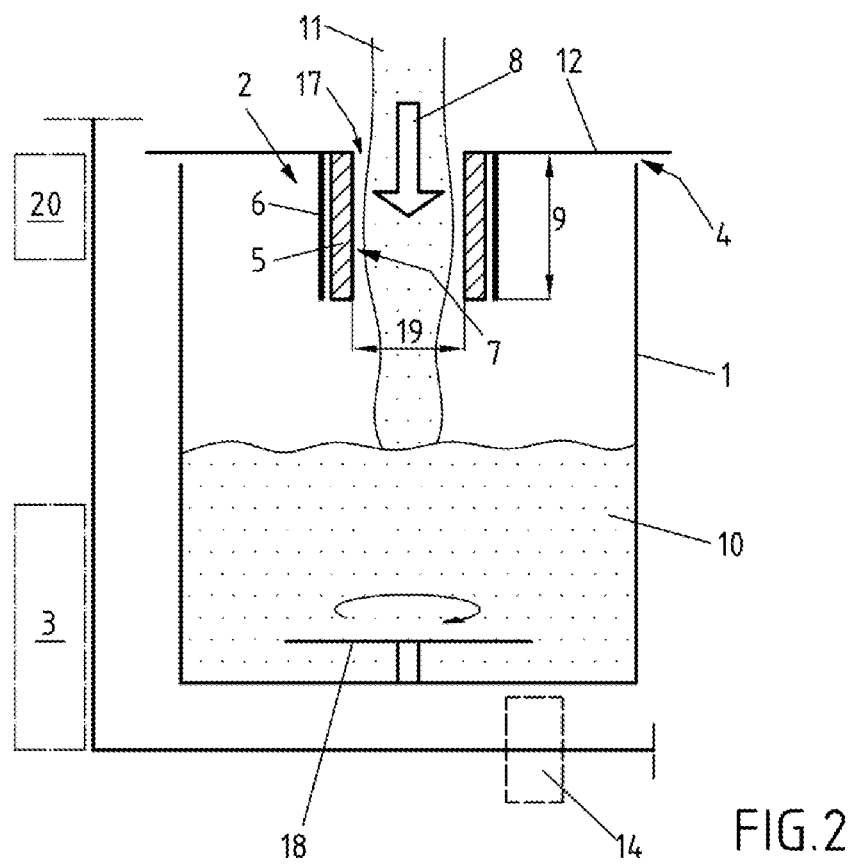
Figure 3:
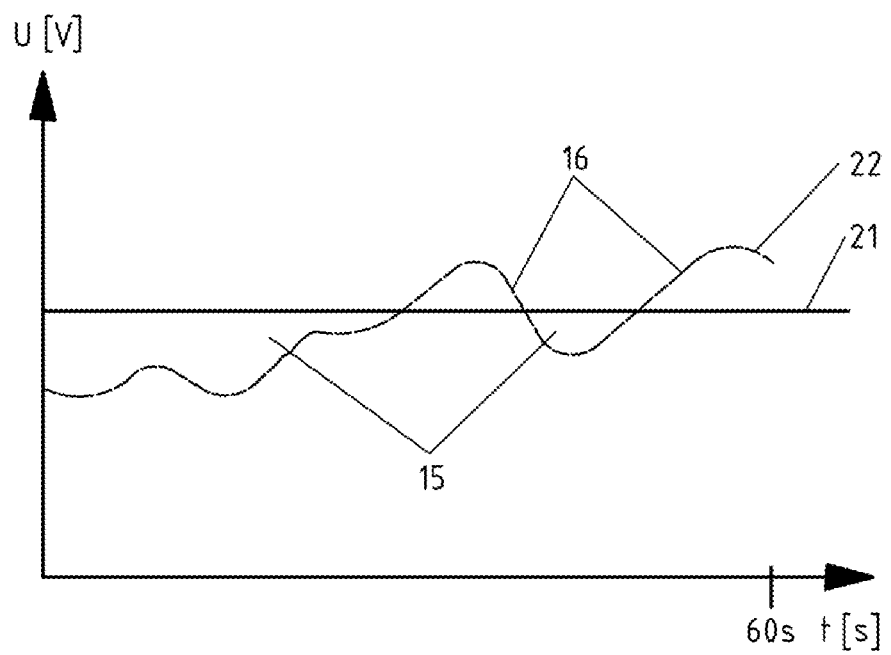
Figure 4:
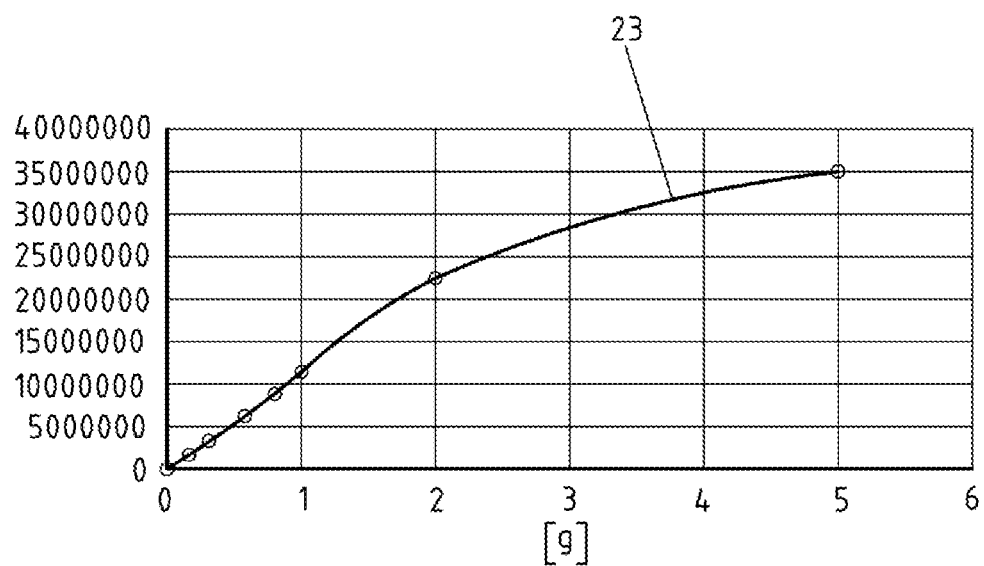

In the Figures:

FIG. 1: shows an illustration of an attachment with the sensor for determining the feeding quantity;

FIG. 2: shows a cross-sectional illustration of a household appliance with the sensor for detecting the feeding quantity on the lid of the food preparation container;

FIG. 3: shows an illustration of a target curve and an actual curve relating to the feeding quantity over time; and FIG. 4: shows an illustration of an exemplary calibration curve for ground coffee.

DETAILED DESCRIPTION

FIG. 1 shows an attachment 13 with an optical or, preferably, an electrostatic-induction-based sensor 2. The attachment 13 can be placed on a lid 12 with an opening 17 and/or fitted into the opening 17. One example for such a lid 12 and such a food preparation container 1 of a household appliance for preparing food 10 is shown in FIG. 2, wherein, if the attachment 13 with an electrostatic-induction-based sensor 2 is provided, the lid 12 does not include a second electrostatic-induction-based sensor 2, in contrast to FIG. 2. The attachment 13 has a funnel shape. A central portion of the attachment 13 is formed or lined by the electrostatic-induction-based sensor 2, which therefore has the shape of a truncated cone. The sensor length 9 is greater than the sensor diameter 19. With the exception of the electrostatic-induction-based sensor 2, the attachment 13 is made from an, in particular transparent, plastic.

FIG. 2 shows the household appliance, in particular the household food processor, for preparing food 10 particularly by chopping or blending by means of a rotatable tool 18 and/or heating by means of a heating element not shown. When the feeds an ingredient 11, in the feed direction 8, into the food preparation container 1 through the opening 17 of the lid 12, the ingredient 11 automatically passes the closed, ring-shaped, cylindrical electrode 5 at the inner face 7 thereof. A shielding means 6 is disposed at the outer circumference of the electrode 5 for electrostatically and electrically shielding it with respect to the food preparation container 1 and/or the lid 12. The sensor length 9 preferably corresponds to about 1.3 times the sensor diameter 19. The weight of the household appliance can be detected with a weight sensor 14. A terminal of the electrode, via which a current signal or sensor signal is transmitted to the control device 3, is not shown. In particular, an amplifier and/or converter unit 20 for amplifying the current signal and/or for conversion into a voltage signal is interposed. When the user feeds an ingredient into the upper side 4 of the food preparation container 1, the feeding quantity is detected by the sensor 2.

FIG. 3 shows a target curve 21 and an actual curve 22 of the feeding quantity, which are plotted, for example, as an electric voltage in the unit volts over the time t in seconds. By comparing the two curves 21, 22, it can be determined whether an indication "too slow" 15 or an indication "too fast" 16 is to be outputted to the user. In principle, a diagram as it is shown in FIG. 3 may also be outputted as an indication.

By way of example, FIG. 4 shows a calibration curve 23 for ground coffee. Different quantities of ground coffee, which were previously weighed, or weighed by the weight sensor 14, are plotted on the X-axis. The absolute value of the integral, in particular squared, of the sensor signal is plotted on the Y-axis. The depicted calibration curve 23, which runs in a substantially linear manner with an approximately constant gradient, was interpolated and extrapolated from the measurement points.

If a user now selects a digital recipe via a user interface, which is not depicted, and is requested to uniformly feed ground coffee into the food preparation container, for example, over a period of time of 60 seconds, as indicated in FIG. 3, then, based on the calibration curve 23 of FIG. 3 and the sensor signals, the current actual feeding quantity is continuously determined and compared to a target feeding quantity. If the current feeding quantity deviates by a previously determined difference from the target feeding quantity, the user is automatically informed, and an indication for correction is outputted.

The invention claimed is:

1. A household appliance for preparing food, the household appliance comprising:
   a food preparation container configured to receive an ingredient for food preparation,
   a rotatable tool connected to the food preparation container and configured to chop or blend the food in the food preparation container,
   at least one sensor configured to provide a sensor signal corresponding to a feeding quantity of the ingredient as the ingredient is fed into the food preparation container without the ingredient coming in contact with the at least one sensor, the at least one sensor being shaped as a closed contour and the food preparation container being disposed below the at least one sensor such that the ingredient moves past an inner face of the at least one sensor prior to entering an interior of the food preparation container, and
   a control device configured to determine a feed rate based on the sensor signal, the control device being configured to output an indication to a user to adjust the feed rate in response to determining, based on the sensor signal, that the feed rate of the ingredient is one of greater than or less than a predefined feed rate.

2. The household appliance according to claim 1, wherein the at least one sensor is arranged such that the ingredient travels past the at least one sensor when fed into the food preparation container and the at least one sensor is arranged at an upper side during operation of the food preparation container.

3. The household appliance according to claim 2, wherein the at least sensor is an electrostatic-induction-based sensor.

4. The household appliance according to claim 3, wherein the electrostatic-induction-based sensor comprises an electrode and an electrostatic shield for the electrode.

5. The household appliance of claim 1, wherein the at least one sensor extends in a feed direction of the ingredient, the feed direction of the ingredient being a direction in which the ingredient is fed into the food preparation container, a length of the at least one sensor in the feed direction corresponding to a value within a range between one and two times a diameter of the at least one sensor.

6. The household appliance according to claim 5, wherein the at least one sensor is detachably coupled to a lid of the food preparation container.

7. The household appliance according to claim 6, wherein the control device is configured to determine the feed rate based on the sensor signal using a calibration curve.

8. The household appliance according to claim 7, further comprising a weight sensor configured to generate the calibration curve.

9. A household appliance for preparing food comprising,
   a food preparation container configured to receive an ingredient for food preparation,
   a rotatable tool connected to the food preparation container and configured to chop or blend the food within the food preparation container,
   an attachment configured to couple to the food preparation container and formed to include at least one sensor configured to cooperate with the food preparation container to emit a sensor signal indicative of a feeding quantity of the ingredient as the ingredient is fed into the food preparation container, the at least one sensor being shaped as a closed contour and the food preparation container being disposed below the at least one sensor such that the ingredient moves past an inner face of the at least one sensor prior to entering an interior of the food preparation container, and
   a control device configured to determine a feed rate based on the sensor signal, the control device being configured to output an indication to a user to adjust the feed rate in response to determining, based on the sensor signal, that the feed rate of the ingredient is one of greater than or less than a predefined feed rate.

10. The household appliance according to claim 9, wherein the attachment is coupled to a lid configured to couple to a portion of the food preparation container.

11. The household appliance according to claim 10, wherein the at least one sensor extends in a feed direction of the ingredient, the feed direction of the ingredient being a direction in which the ingredient is fed into the food preparation container, a length of the at least one sensor in the feed direction corresponding to a value within a range between one and two times a diameter of the at least one sensor.

12. The household appliance according to claim 11, wherein, in response to the sensor signal, the household appliance is configured to output an indication to a user, the indication configured to indicate to the user whether the ingredient is being fed into the food preparation container too slowly.

13. The household appliance according to claim 9, wherein the control device is configured to determine the feed rate based on the at least one sensor signal using a calibration curve.

14. A household appliance for preparing food, the household appliance comprising
   a food preparation container having an upper side arranged around an upwardly-opening aperture leading into the food preparation container configured to receive an ingredient moving into the food preparation container for preparation,
   an ingredient-entry opening in communication with the upper side of the food preparation container to conduct the ingredient moving into the food preparation container toward a lower side of the food preparation container for preparation, the ingredient-entry opening sized to fit within a footprint of the upwardly-opening aperture leading into the upper side of the food preparation container when the household appliance is viewed from above, a rotatable tool connected to the food preparation container and configured to chop or blend the food within the food preparation container, a sensor configured to provide a sensor signal corresponding to a feeding quantity of the ingredient moving into the food preparation container for preparation, the sensor being shaped to have a closed contour that surrounds the ingredient-entry opening when the household appliance is viewed from above and to be spaced apart from the food preparation container, and a control device configured to determine a feed rate based on the sensor signal, the control device being configured to output an indication to a user to adjust the feed rate in response to determining, based on the sensor signal, that the feed rate of the ingredient is one of greater than or less than a predefined feed rate.

15. The household appliance of claim 14, wherein the sensor is shaped to have a length that extends downwardly from the lid and into the upper side of the food preparation container.

16. The household appliance of claim 15, wherein the sensor has a ring-shape when viewed from above and the length that extends downwardly from the lid is greater than the diameter of the ring-shape.

17. The household appliance of claim 16, wherein the length that extends downwardly from the lid about 1.3 times the diameter of the ring-shape so as to provide a reliable and precise sensor signal corresponding to the feeding quantity of the ingredient moving into the food preparation container for preparation.

18. The household appliance of claim 15, wherein the sensor has a truncated cone shape with a maximum diameter adjacent to the lid and a minimum diameter spaced from the lid in the upper side of the food preparation container.

19. The household appliance of claim 15, wherein the sensor includes an electrode at the inner face thereof that surrounds the ingredient-entry opening when the household appliance is viewed from above and shielding means disposed outward of and around the electrode when the household appliance is viewed from above to electrically shield the electrode with respect to the food preparation container.

20. The household appliance of claim 14, further comprising a weight sensor configured to provide a weight signal corresponding to the household appliance, wherein the controller is configured to determine the feed rate based at least in part on the weight signal.

21. The household appliance of claim 20, wherein the controller is configured to determine the feed rate based at least in part on a calibration curve having an axis value associated with weight and an axis associated with feeding quantity.

22. The household appliance of claim 14, further comprising a rotatable tool located in the lower side of the food preparation container that is configured to chop or blend food deposited in the lower side of the food preparation container via the ingredient-entry opening after interaction with the sensor.

* * * * *